I. S. & H. R. Russell.
Mower.

No. 95,383. Patented Sep. 28, 1869.

Witnesses:

Isaac S. Russell
Henry R. Russell
by Attorneys
Brown, Coombs & Co.

United States Patent Office.

ISAAC S. RUSSELL, OF NEW MARKET, MARYLAND, AND HENRY R. RUSSELL, OF WOODBURY, NEW JERSEY.

Letters Patent No. 95,383, dated September 28, 1869.

IMPROVED CASTER-WHEEL FOR HARVESTERS.

The Schedule referred to in these Letters Patent and making part of the same.

*To all whom it may concern:*

Be it known that we, ISAAC S. RUSSELL, of New Market, in Frederick county, and State of Maryland, and HENRY R. RUSSELL, of Woodbury, in Gloucester county, and State of New Jersey, have invented a new and useful Improvement in Caster-Wheels for Harvesters; and we do hereby declare that the following is a full, clear, and exact description thereof, reference being had to the accompanying drawing, forming part of this specification, and in which—

Figure 1:
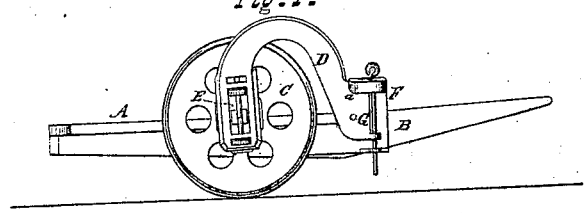
Figure 1 represents a side elevation of the wheel, and that portion of the machine to which it is attached.
Figure 2:
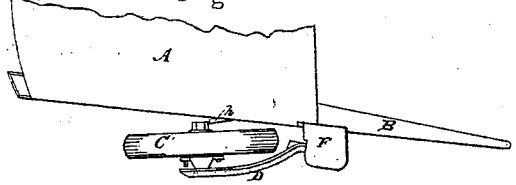
Figure 2 is a top view of the same.
Figure 3:
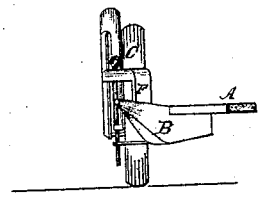

Figure 3, a front view; and

Figure 4:
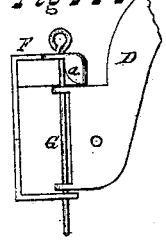

Figure 4, a rear view of the bracket-attachment, with the wheel swung outwardly.

The same letters indicate corresponding parts in the several figures.

This invention may be regarded as an additional improvement on patents No. 67,914 and 81,215; and it consists in connecting the wheel-supporting or swinging bracket with the frame of the harvester floor, by a vertical pin passing through a fixed bracket, provided with a cam-like bearing-edge, of such form as to retain said swinging bracket in a fixed position, under ordinary circumstances, but to admit of its swinging outwardly on meeting with obstruction, or in turning curves, to avoid lateral drag on the ground over which it is passing.

Referring to the drawing—

A represents the platform of a harvester;

B, the dividing-finger; and

C, the supporting-wheel, which revolves on an axle, so connected with the caster-bar D as to be capable of having a limited motion in the arc of a circle around the vertical pin E, which connects it with the said bar D.

The bracket E is rigidly attached to the dividing-finger B, or other suitable framing of the machine, and to this is hinged the caster-bar D, by a pin, G, passing vertically, or nearly so, through them, which admits of said bar, and with it the caster-wheel, swinging round to the extent of half a circle, or thereabouts, and still retaining a position vertical, or nearly so.

This bracket F has a cam-like formation, as shown at $a$, in fig. 4, by which the caster-bar D is retained in position, until the wheel C meets with obstruction, or is inclined to drag upon the ground, by the motion of the machine in turning curves, when the resistance to its travel will cause the cam $a$ to ride the edge of the bar D, and allow it to assume a position in which the wheel will rotate without strain or drag.

On the side of the frame of the flooring of the machine is a projection, $h$, which, under certain circumstances, acts as a retainer, to insure the parallel position of the axle of the caster-wheel, with relation to the axle of the main wheel of the machine; for instance, in backing the machine, in a direct line, without said stop or projection, $h$, the inner end of the swinging-axle of the caster-wheel would be forced forward, and cause said wheel to assume a position angular to the motion of the machine, and thereby carry the caster outwardly, until its supporting bar, D, would swing around half of a circle; but by the application of said stop, $h$, the axle of the centre-wheel is retained in a line parallel to the axle of the main wheel, so long as they are moving in a direction at right angles to their axes; but so soon as the motion is such that the caster-wheel describes the arc of a circle around the main wheel, in a backwardly direction, its axle becomes free from said stop, and is allowed to assume a position in a radial line from the axis of the main wheel, and thus to turn the curve without drag on the ground. This might be accomplished by a bolt or lever, either connected with the frame of the machine or with the caster-bar, and under control of the driver, but we prefer the automatic device above described.

Having thus described our invention,

What we claim as new, and desire to secure by Letters Patent, is—

1. The combination and arrangement of the bracket F, having a cam, $a$, with the swinging caster-bar D, substantially as and for the purpose set forth.

2. The bracket F, having cam $a$, and supporting the swinging caster-bar D, in combination with the vibrating axle of the caster-wheel C, substantially as shown and described.

3. The arrangement of the stop or projection $h$, in combination with the vibrating axle of the caster-wheel C, substantially as and for the purpose set forth.

In testimony whereof, we have hereunto signed our names, before two subscribing witnesses.

ISAAC S. RUSSELL.
HENRY R. RUSSELL.

Witnesses:
JESSE C. HAINES,
GEO. H. SOWERS.